No. 696,035. Patented Mar. 25, 1902.
J. GILSON.
METAL FOUNDING.
(Application filed Apr. 19, 1900.)
(No Model.) 2 Sheets—Sheet 1.
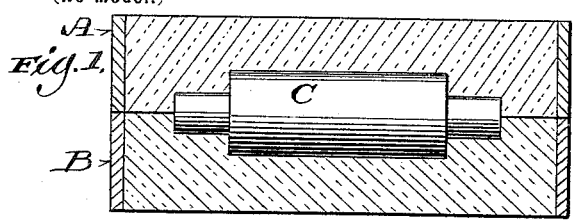
Fig. 1.
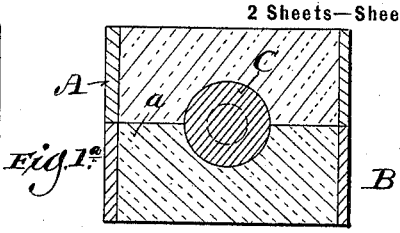
Fig. 1.ª
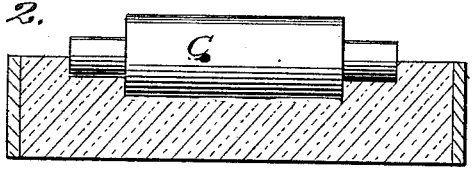
Fig. 2.
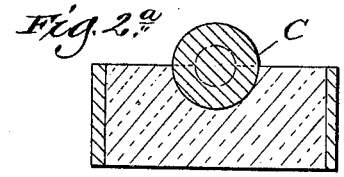
Fig. 2.ª
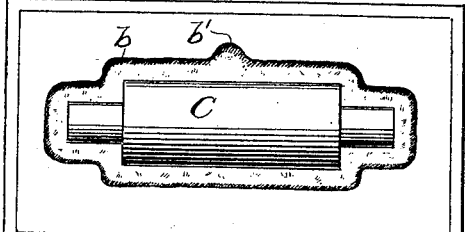
Fig. 3.
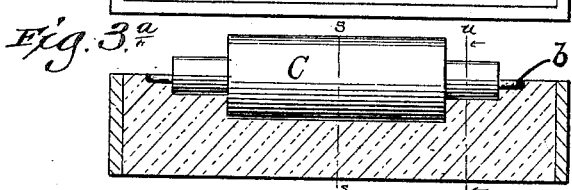
Fig. 3.ª
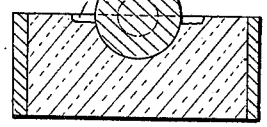
Fig. 3.ᵇ
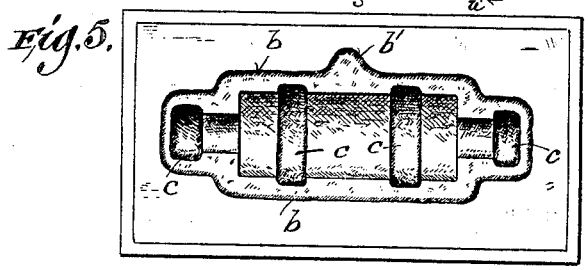
Fig. 5.
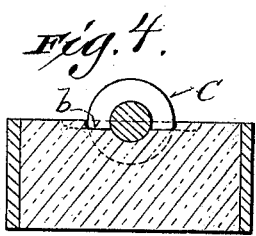
Fig. 4.
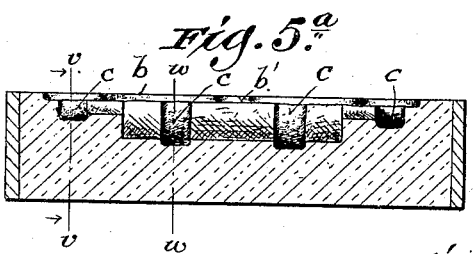
Fig. 5.ª
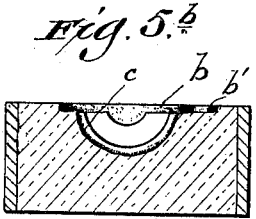
Fig. 5.ᵇ
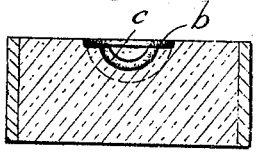
Fig. 5.ᶜ
Witnesses:
Geo. W. Tracy.
N. E. Oliphant.
Inventor:
John Gilson
By H. G. Underwood
Attorney
THE NORRIS PETERS CO., PHOTO-LITHO., WASHINGTON, D. C.

No. 696,035. Patented Mar. 25, 1902.
J. GILSON.
METAL FOUNDING.
(Application filed Apr. 19, 1900.)
(No Model.)
2 Sheets—Sheet 2.
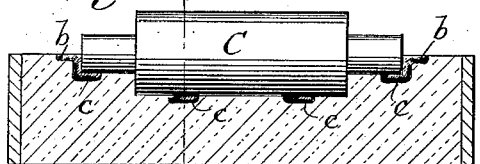
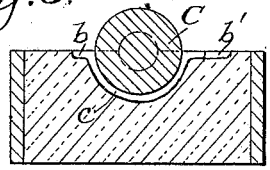
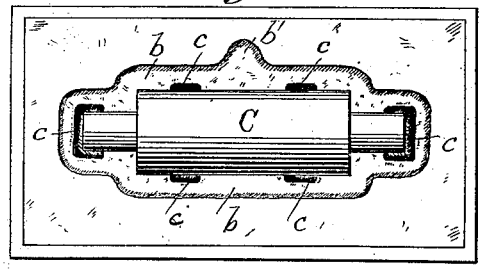
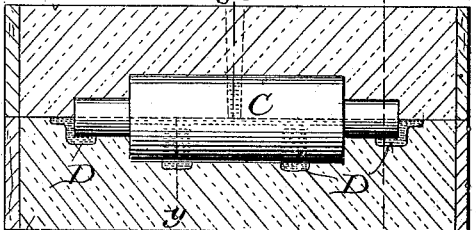
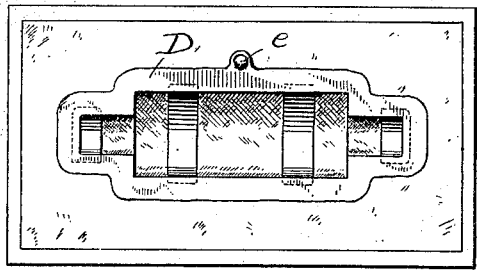
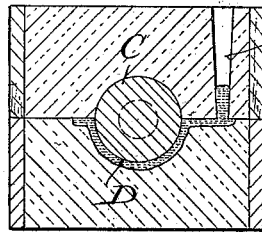
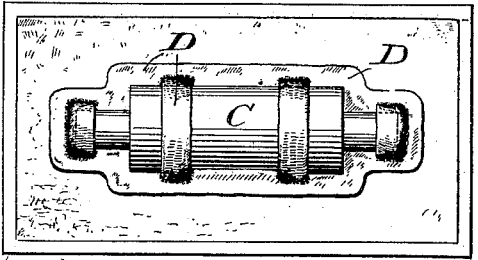
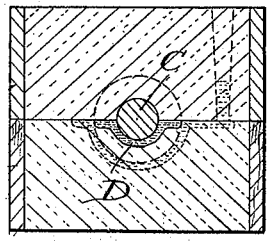
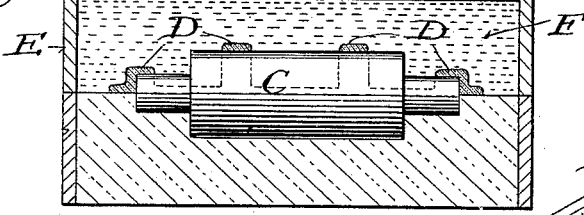
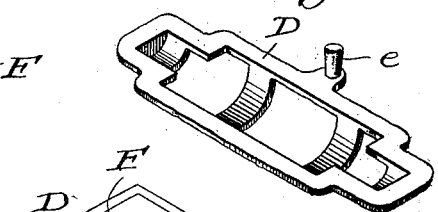
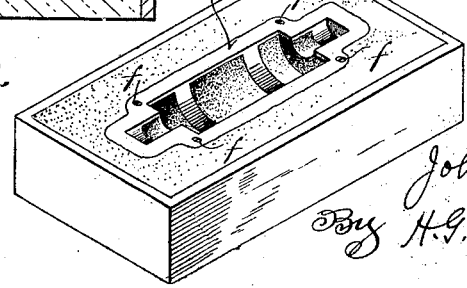
Witnesses:
Geo. N. Lamy
N. E. Oliphant
Inventor
John Gilson,
By H. G. Underwood
Attorney
THE NORRIS PETERS CO., PHOTO-LITHO., WASHINGTON, D. C.

UNITED STATES PATENT OFFICE.

JOHN GILSON, OF PORT WASHINGTON, WISCONSIN.

METAL-FOUNDING.

SPECIFICATION forming part of Letters Patent No. 696,035, dated March 25, 1902.

Application filed April 19, 1900. Serial No. 13,454. (No model.)

*To all whom it may concern:*

Be it known that I, JOHN GILSON, a citizen of the United States, and a resident of Port Washington, in the county of Ozaukee and State of Wisconsin, have invented certain new and useful Improvements in Metal-Founding; and I do hereby declare that the following is a full, clear, and exact description thereof.

My invention has for its object to substitute metallic matchers for those of plastic composition common in foundries at the present time; and said invention consists in the process hereinafter particularly set forth with reference to the accompanying drawings and subsequently claimed, said drawings being for the most part a series of diagrams illustrating the various steps in said process.

Figure 1 represents a longitudinal sectional view of a sand mold with a pattern therein; Fig. 1ª, a transverse section of what is shown in the preceding figure; Fig. 2, a longitudinal section of a part of the mold with the pattern in place; Fig. 2ª, a transverse section of the parts in the preceding figure; Fig. 3, a plan view of a mold-section and pattern after mutilation of the former to provide a shallow channel adjacent to the outline of said pattern; Fig. 3ª, a longitudinal section of the mutilated part of the mold with the pattern therein; Figs. 3ᵇ and 4, transverse sections respectively indicated by lines *s s* and *u u* in Fig. 3ª; Fig. 5, a plan view of the mutilated part of the mold having more of the sand removed to provide shallow bridge-channels; Fig. 5ª, a longitudinal section of what is shown in the preceding figure; Figs. 5ᵇ and 5ᶜ, transverse sections respectively indicated by lines *v v* and *w w* in Fig. 5ª; Fig. 6, a longitudinal section of the mutilated part of the mold supporting the pattern; Fig. 6ª, a plan view of what is shown in the preceding figure; Fig. 6ᵇ, a transverse section on line *x x* in Fig. 6; Fig. 7, a longitudinal section of the mutilated mold inclosing a pattern and casting; Figs. 7ª and 7ᵇ, transverse sections respectively indicated by lines *y y* and *z z* in Fig. 7; Fig. 8, a plan view of the mutilated part of the mold with the casting therein; Fig. 9, a perspective view of the casting; Fig. 10, a plan view of a part of a mold, the pattern therein, and the casting surmounting said pattern; Fig. 11, a longitudinal section illustrating the pattern set up in part of the sand mold, the casting on the pattern, and a superimposed inverted box poured full of material that will solidify to form a bed for said casting; and Fig. 12, a perspective view of the casting in its bed.

Referring by letter to the drawings, A B indicate sections of an ordinary sand mold made on a pattern C, this pattern being of metal or other material that will not ignite or be injured by contact with molten metal poured in the mold after mutilation of a section of same, as hereinafter more fully explained. The mold having been completed on the pattern it is parted and a section thereof set to one side for the time being, after which some of the sand in the other section is removed to form a narrow shallow channel *b* adjacent to the contour of the pattern-print therein. Prior to forming the channel the sand may be moistened adjacent to the pattern-print to improve its adhesiveness. The channel being completed, cross-channels *c* are made in the sand at intervals of the pattern-print to communicate with the former channel and provide for the formation of bridges constituting parts of a casting that results from pouring the mold, as hereinafter more particularly specified. The above-described mutilation of a section of the mold having been accomplished, said mold is again assembled to inclose the pattern, the latter being preferably treated with oil or other greasy material dusted with plumbago to prevent it from sticking in the casting. In some instances it may be preferable to enlarge the whole of the pattern-print and have the space thus formed communicate with the space obtained by the channel *b* aforesaid.

As shown in Fig. 7ª, an ingate is made in the mold to register with a bay *b'* of channel *b* in the mutilated mold-section, and molten metal, preferably babbitt or what is generally termed "white-metal," is now poured in said mold to fill any and all space provided adjacent to the pattern, the result being a casting D that thereafter constitutes a matcher for the aforesaid pattern. The pattern and its matcher are now withdrawn from the mold, after which the sprue *e* is removed from said matcher and said pattern greased prior to being again set in a mold-section to support the aforesaid matcher inverted, this assemblage being shown in Fig. 11.

A box E, inverted on the mold-section supporting the pattern and inverted matcher, is provided with a bottom opening or ingate through which to pour material F, that will solidify and form a flush-top bed for the matcher, this material being preferably plaster-of-paris mixed with water. The embedding material having set in the box about the matcher, said box and contents are lifted away from the pattern and mold-section, to be thereafter utilized by molders as occasion may require in precisely the same way as the ordinary plastic-composition matchers. If desirable, screws f may be employed to connect the matcher and its bed, as shown in Fig. 12.

The utilization of babbitt or white-metal for the matcher-casting is preferred, as such a casting may be smoothed up, if necessary, by an ordinary soldering-iron, and the great advantage of a metallic matcher lies in the fact that it is not liable to fracture, a common fault with the ordinary plastic-composition matchers, especially when molders are careless and its pattern edges remain sharp for an indefinite period. The metallic matcher is also proof against shrinkage, another common fault with the ordinary plastic-composition matchers.

Having thus described my invention, what I claim as new, and desire to secure by Letters Patent, is—

1. A process of making pattern-matchers consisting in forming a sand mold on a pattern, parting the mold, channeling a section of said mold adjacent to the contour of the pattern-print therein, removing the pattern, cross-channeling said pattern-print, incasing said pattern in the mold, pouring said mold, and subsequently setting the casting in a hardened plastic bed.

2. A process of making pattern-matchers consisting in forming a sand mold on a pattern, parting the mold, channeling a section of said mold adjacent to the contour of the pattern-print therein, removing the pattern, cross-channeling said pattern-print, incasing said pattern in the mold, pouring said mold, setting up the pattern in a mold-section with the casting inverted on said pattern, surmounting the mold-section with an inverted box, filling the box, through an aperture therein, with a material that will solidify about said casting, and finally making the aforesaid casting fast in the surrounding material.

In testimony that I claim the foregoing I have hereunto set my hand, at Port Washington, in the county of Ozaukee and State of Wisconsin, in the presence of two witnesses.

JOHN GILSON.

Witnesses:
H. W. BOLENS,
C. A. SEIFERT.